(12) United States Patent
Siomina et al.

(10) Patent No.: US 10,292,100 B2
(45) Date of Patent: May 14, 2019

(54) METHOD AND APPARATUS FOR INDICATING AND ADAPTING THE ACTIVITY STATE OF A WIRELESS DEVICE HAVING DEVICE-TO-DEVICE COMMUNICATION CAPABILITIES

(71) Applicant: TELEFONAKTIEBOLAGET LM ERICSSON (PUBL), Stockholm (SE)

(72) Inventors: Iana Siomina, Stockholm (SE); Muhammad Kazmi, Stockholm (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 9 days.

(21) Appl. No.: 15/309,235

(22) PCT Filed: Nov. 12, 2014

(86) PCT No.: PCT/EP2014/074416
§ 371 (c)(1),
(2) Date: Nov. 7, 2016

(87) PCT Pub. No.: WO2015/169405
PCT Pub. Date: Nov. 12, 2015

(65) Prior Publication Data
US 2017/0078964 A1    Mar. 16, 2017

Related U.S. Application Data

(60) Provisional application No. 61/990,245, filed on May 8, 2014.

(51) Int. Cl.
*H04W 52/02* (2009.01)
*H04W 72/04* (2009.01)
(Continued)

(52) U.S. Cl.
CPC ..... *H04W 52/0216* (2013.01); *H04W 72/048* (2013.01); *H04W 72/0446* (2013.01);
(Continued)

(58) Field of Classification Search
CPC ............. H04W 76/048; H04W 76/043; H04W 52/0216; H04W 72/0446; H04W 72/048;
(Continued)

(56) References Cited

U.S. PATENT DOCUMENTS

2013/0170398 A1    7/2013    Kwon
2013/0170414 A1    7/2013    Kwon
(Continued)

FOREIGN PATENT DOCUMENTS

WO    2010025774 A1    3/2010
WO    2010082114 A1    7/2010

OTHER PUBLICATIONS

3GPP, "3rd Generation Partnership Project; Technical Specification Group Services and System Aspects; Feasibility study for Proximity Services (ProSe) (Release 12)," 3GPP TR 22.803 V12.2.0, Jun. 2013.

(Continued)

*Primary Examiner* — Rownak Islam
(74) *Attorney, Agent, or Firm* — Patent Portfolio Builders, PLLC

(57) ABSTRACT

A method implemented at a network node configured for operation in a wireless communication network. The method includes determining a Device-to-Device (D2D) activity status of a wireless device that is registered in the network and has network communications capability and D2D communications capability, and adapting one or both of network and D2D operations with respect to the wireless device, in dependence on the determined activity status.

42 Claims, 6 Drawing Sheets

(51) Int. Cl.
*H04W 76/28* (2018.01)
*H04W 76/23* (2018.01)

(52) U.S. Cl.
CPC ............ *H04W 76/28* (2018.02); *H04W 76/23* (2018.02); *Y02D 70/00* (2018.01); *Y02D 70/1262* (2018.01); *Y02D 70/142* (2018.01); *Y02D 70/146* (2018.01); *Y02D 70/21* (2018.01); *Y02D 70/22* (2018.01); *Y02D 70/24* (2018.01); *Y02D 70/25* (2018.01)

(58) Field of Classification Search
CPC . H04W 76/04; H04W 52/0212; H04W 76/23; H04W 76/28; Y02B 60/50; Y02D 70/21; Y02D 70/1262; Y02D 70/00; Y02D 70/142; Y02D 70/146; Y02D 70/22; Y02D 70/24; Y02D 70/25
USPC .......................................................... 370/311
See application file for complete search history.

(56) References Cited

U.S. PATENT DOCUMENTS

| | | | |
|---|---|---|---|
| 2014/0064203 A1* | 3/2014 | Seo | H04W 28/06 370/329 |
| 2014/0129672 A1* | 5/2014 | Singh | H04L 43/08 709/217 |
| 2015/0003440 A1* | 1/2015 | Lim | H04W 76/023 370/346 |
| 2016/0100355 A1* | 4/2016 | Chen | H04W 8/005 370/232 |
| 2016/0234702 A1* | 8/2016 | Heo | H04W 76/38 |

OTHER PUBLICATIONS

International Search Report and Written Opinion dated Aug. 10, 2015 in related International Application No. PCT/EP2014/074416.
Office Action in application No. 14796769.9 dated Jun. 14, 2018. 7 pages.

* cited by examiner

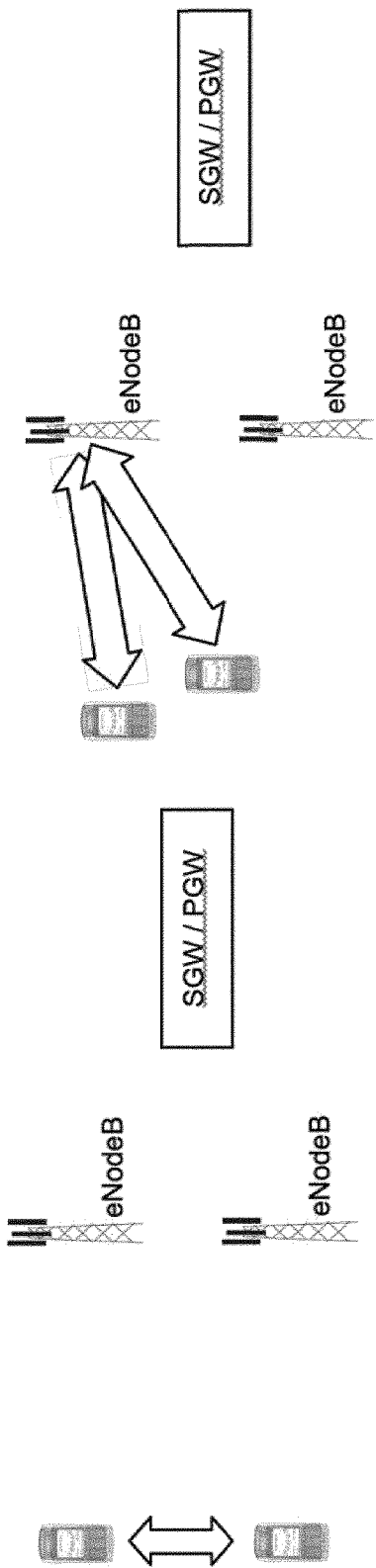
FIG. 1
FIG. 2
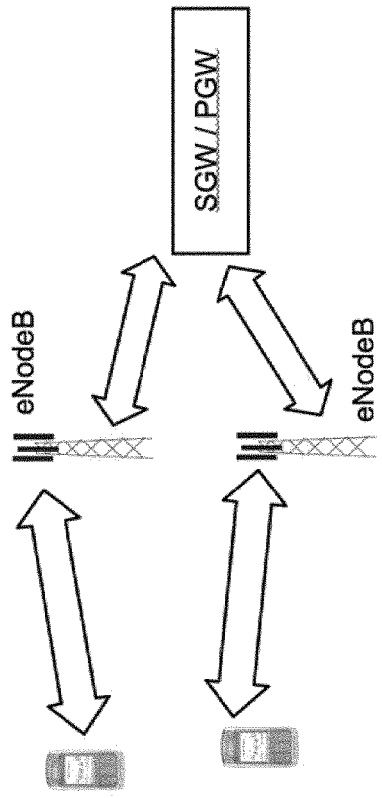
FIG. 3

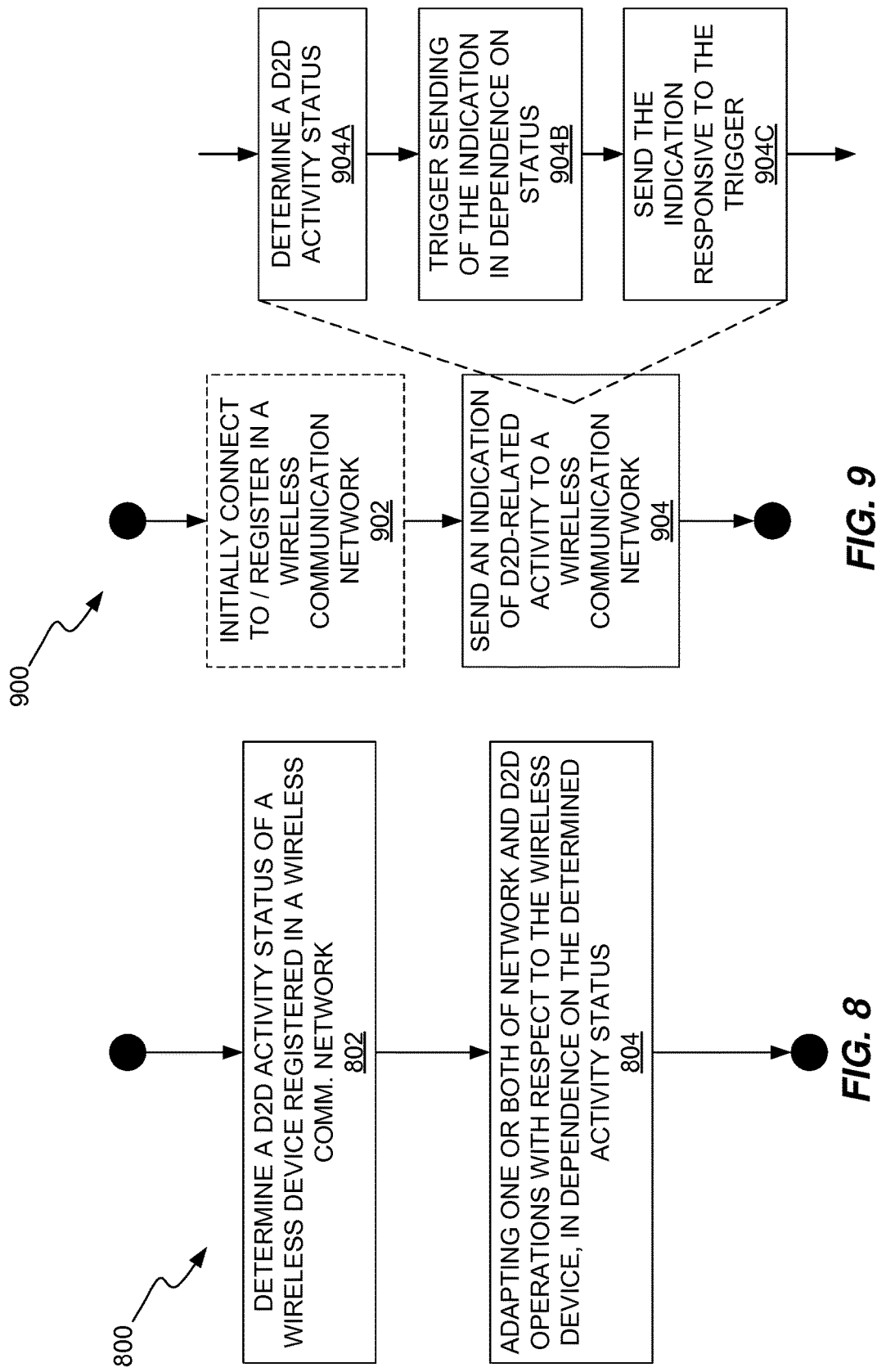

METHOD AND APPARATUS FOR INDICATING AND ADAPTING THE ACTIVITY STATE OF A WIRELESS DEVICE HAVING DEVICE-TO-DEVICE COMMUNICATION CAPABILITIES

TECHNICAL FIELD

The present invention relates to wireless communication networks, such as are used to provide cellular communication services to compatible devices, and particularly relates to indicating and adapting the activity states of wireless devices having device-to-device communication capabilities.

BACKGROUND

FIG. 1 illustrates an example of two wireless devices using a "direct mode" of communication, based on the two devices being in relatively close proximity to one another. In an example case, the two devices are referred to as user equipments, or UEs. Each UE is configured for operation in a Third Generation Partnership Project (3GPP) communication network, e.g., a cellular communication network based on the Long Term Evolution (LTE) specifications. Further, each UE is configured for Device-to-Device (D2D) communications, which allows each device to talk to other devices having compatible D2D communication capabilities. D2D communications may be network-assisted when one or both devices are operating within the coverage of the cellular network.

FIG. 2 illustrates a variation on D2D communications between the two devices. This variation is referred to as "locally-routed" communications, in that the signaling between the two devices is conveyed through a serving base station—eNodeB in LTE. However, unlike conventional cellular communication signaling between two devices, the signaling is not routed through the default path, which includes the "core network" of the supporting cellular communication network. See FIG. 3 for an example of this conventional default-path routing case, where signaling between two devices is communicated through serving gateway (SGW)/packet gateway (PGW) nodes in the core network associated with the Radio Access Network (RAN) supporting the two UEs.

In device-to-device communication, the source and the target are wireless devices, e.g., UEs. Some of the potential advantages are offloading of the cellular network, faster communication, increased awareness of surrounding wireless devices of interest (e.g., running the same application), higher-quality links due to a shorter distance, etc. Some appealing applications of D2D communications are video streaming, online gaming, media downloading, peer-to-peer (P2P), file sharing, etc.

FIG. 4 illustrates a reference architecture for D2D operations, where "ProSe" denotes "Proximity Services," and indicates services available via D2D communication between devices in proximity to one another. See the 3GPP Technical Reference, TR 22.803, Feasibility study for Proximity Services (ProSe), for example details regarding this architecture, and the above-described direct communications, locally routed communications, and default-path communications. Further, in the context of FIG. 4, "APP" denotes application, "E-UTRAN" denotes an Evolved Universal Terrestrial Radio Access Network, as used for the radio access part of LTE. "EPC" denotes Evolved Packet Core, as used for the core network part of LTE.

Numerous challenges attend the effective integration of D2D communications capability into the overall communication system framework. For example, it is recognized herein that "Discontinuous Reception" (DRX) presents a number of challenges and opportunities with respect to D2D-capable wireless devices. Discontinuous Reception (DRX) has been introduced as one of the key solutions for conserving battery power in wireless devices operating within a wireless communication network.

In the LTE example case, DRX is characterized by the following:
Per UE mechanism (as opposed to per radio bearer);
May be used in RRC_IDLE and RRC_CONNECTED; In RRC_CONNECTED, eNodeB/UE may initiate the DRX mode when there are no outstanding/new packets to be transmitted/received; in RRC_IDLE
2G and 3G terminal use discontinuous reception in idle state to increase battery life time. HSPA and LTE have introduced DRX also for connected state
Available DRX values are controlled by the network and start from non-DRX up to 2.56 seconds in LTE in RRC connected state. Even longer DRX cycles may be introduced in the future.
HARQ operation related to data transmission is independent of DRX operation and the UE wakes up to read the PDCCH for possible retransmissions and/or ACK/ NAK signalling regardless of DRX In the downlink, a timer is used to limit the time the UE stays awake awaiting for a retransmission;
When DRX is configured, the UE may be further configured with an "on-duration" timer during which time the UE monitors the PDCCHs for possible allocations;
When DRX is configured, periodic CQI reports can only be sent by the UE during the "active-time". RRC can further restrict periodic CQI reports so that they are only sent during the on-duration;
Network node (e.g., eNodeB) does not transmit packets to UE during the sleep mode.
RRC_CONNECTED mode DRX should not be mixed up with DRX in idle mode which the mobile is set into after a prolonged time of air interface inactivity. Its also known as paging DRX, i.e. the time the mobile device can go to sleep between two paging messages which could contain a command for the mobile to wake up again and change back to RRC_CONNECTED state. In the RRC connected state, the possible DRX cycles vary from very short DRX cycle lengths (e.g. 2 ms), to much longer DRX cycle lengths (e.g., hundreds of milliseconds or even seconds, such as 2.56 s).

Parameters Related to DRX
The following definitions apply to DRX in E-UTRAN:
on-duration: duration in downlink subframes that the UE waits for, after waking up from DRX, to receive PDCCHs. If the UE successfully decodes a PDCCH, the UE stays awake and starts the inactivity timer;
inactivity-timer: duration in downlink subframes that the UE waits to successfully decode a PDCCH, from the last successful decoding of a PDCCH, failing which it re-enters DRX. The UE shall restart the inactivity timer following a single successful decoding of a PDCCH for a first transmission only (i.e. not for retransmissions).
active-time: total duration that the UE is awake. This includes the "on-duration" of the DRX cycle, the time UE is performing continuous reception while the inactivity timer has not expired and the time UE is performing continuous reception while waiting for a DL retransmission after one HARQ RTT. Based on the above the minimum active time is of length equal to on-duration, and the maximum is undefined (infinite).

Of the above parameters the on-duration and inactivity-timer are of fixed lengths, while the active-time is of varying lengths based on scheduling decision and UE decoding success. Only on-duration and inactivity-timer duration are signaled to the UE by the network node (e.g., an eNodeB):

There is only one DRX configuration applied in the UE at any time;

UE shall apply an on-duration on wake-up from DRX sleep.

DRX mode in LTE is illustrated in FIG. 5. DRX is triggered by means of an inactivity time known as DRX. As can be seen from FIG. 5, the UE activity time may be extended if PDCCH is received during ON Duration time. However, it may also be shorten by a MAC DRX command, upon reception of which the UE stops onDurationTimer and drx-InactivityTimer.

If PDCCH has not been successfully decoded during the on-duration, the UE shall follow the DRX configuration (i.e. the UE can enter DRX sleep if allowed by the DRX configuration):

This applies also for the sub-frames where the UE has been allocated predefined resources.

If it successfully decodes a PDCCH for a first transmission, the UE shall stay awake and start the inactivity timer (even if a PDCCH is successfully decoded in the sub-frames where the UE has also been allocated predefined resources) until a MAC control message tells the UE to re-enter DRX, or until the inactivity timer expires. In both cases, the DRX cycle that the UE follows after re-entering DRX is given by the following rules:

If a short DRX cycle is configured, the UE first follows the short DRX cycle and after a longer period of inactivity the UE follows the long DRX cycle; if short DRX cycle is used, the long cycle will be a multiple of the short cycle;

Durations for long and short DRX are configured by the RRC. The transition between the short and long DRX cycles is determined by the eNodeB MAC commands (if the command is received and short DRX is configured, the UE will (re)start drxShortCycleTimer and use the Short DRX Cycle; otherwise long DRX will be used) or by the UE based on an activity timer Else the UE follows the long DRX cycle directly.

Some parameters that may be configured by the network:

onDurationTimer can be (in PDCCH subframes): 1, 2, 3, 4, 5, 6, 8, 10, 20, 30, 40, 50, 60, 80, 100, and 200 drx-InactivityTimer can be (in PDCCH subframes): 1, 2, 3, 4, 5, 6, 8, 10, 20, 30, 40, 50, 60, 80, 100, 200, 300, 500, 750, 1280, 1920, 2560. A specific value may also be configured if the UE supports IDC (in-device co-existence)

longDRX-CycleStartOffset (in subframes): depending on the cycle length, but up to 2559 shortDRX-cycle (in subframes): 2, 5, 8, 10, 16, 20, 32, 40, 64, 80, 128, 160, 256, 320, 52, 640

UE Active Time and UE Transmissions when Using DRX

When a DRX cycle is configured, the Active Time includes the time while:

onDurationTimer or drx-InactivityTimer or drx-RetransmissionTimer or mac-ContentionResolutionTimer is running; or a Scheduling Request is sent on PUCCH and is pending; or an uplink grant for a pending HARQ retransmission can occur and there is data in the corresponding HARQ buffer; or a PDCCH indicating a new transmission addressed to the C-RNTI of the UE has not been received after successful reception of a Random Access Response for the preamble not selected by the UE.

Generally, new transmissions can only take place during the active-time (so that when the UE is waiting for one retransmission only, it does not have to be "awake" during the RTT).

When not in Active Time, type-0-triggered SRS [2] shall not be reported.

If CQI masking (cqi-Mask) is setup by upper layers:
when onDurationTimer is not running, CQI/PMI/RI/PTI on PUCCH shall not be reported,
else:
when not in Active Time, CQI/PMI/RI/PTI on PUCCH shall not be reported.

That is, cqi-Mask is effectively limiting CQI/PMI/PTI/RI reports to the on-duration period of the DRX cycle, and the same one value applies for all serving cells (the associated functionality is common i.e. not performed independently for each cell).

There are a few exceptions:

Regardless of whether the UE is monitoring PDCCH or not, the UE receives and transmits HARQ feedback and transmits type-1-triggered SRS when such is expected.

A UE may optionally choose to not send CQI/PMI/RI/PTI reports on PUCCH and/or type-0-triggered SRS transmissions for up to 4 subframes following a PDCCH indicating a new transmission (UL or DL) received in subframe n-i, where n is the last subframe of Active Time and i is an integer value from 0 to 3. After Active Time is stopped due to the reception of a PDCCH or a MAC control element a UE may optionally choose to continue sending CQI/PMI/RI/PTI reports on PUCCH and/or SRS transmissions for up to 4 subframes. The choice not to send CQI/PMI/RI/PTI reports on PUCCH and/or type-0-triggered SRS transmissions is not applicable for subframes where onDurationTimer is running and is not applicable for subframes n-i to n.

Problems with Existing Solutions

The network may be not aware of the UE's D2D activity and therefore the UE's DRX may be configured by the network without accounting for its D2D activity.

SUMMARY

According to one aspect of the teachings herein, an example method is implemented at a network node configured for operation in a wireless communication network. The method includes determining a Device-to-Device (D2D) activity status of a wireless device that is registered in the network and has network communications capability and D2D communications capability, and adapting one or both of network and D2D operations with respect to the wireless device, in dependence on the determined activity status.

By way of example, determining the D2D activity status comprises any one or more of: determining that the wireless device is active on the D2D link; determining that the wireless device will be active on the D2D link, e.g., at a certain scheduled time or within a certain window of time; determining that the wireless device is not active on the D2D link; determining that the wireless device will stop being active on the D2D link, e.g., at a certain scheduled time or within a certain window of time; determining timing information regarding a duration and/or start of D2D activity by the wireless device; or determining timing information regarding a duration or end of D2D activity, where the indication is that the wireless device will stop being active on the D2D link. Additionally, or alternatively, determining the D2D activity status comprises determining one or more parameters regarding discontinuous operation by the wireless on its D2D link, such as determining one or more Discontinuous Reception (DRX) and/or Discontinuous Transmission (DTX) timing parameters in use at the wireless device with respect to the D2D link.

In further examples, the determining of the device's D2D activity status is based on any one or more of: measurements sent from the wireless device; measurements sent from another wireless device, based on signals transmitted from the wireless device; measurements made by the network node, or by another network node, on signals transmitted by the wireless device; an indication, such as a message, signal, or value, sent from the wireless device, which indication may be explicit or implicit, e.g., such as a predefined signaling pattern or value; or an indication sent from another network node. For example, the network node at issue is a radio base station and it receives the indication from another radio base station or a control node in the wireless communication network, which other network node is explicitly or implicitly aware of the D2D activity status of the wireless device.

Broadly, according to one or more aspects of the teachings herein, a network node implements an example method that includes determining a wireless device's D2D activity, e.g., that the device is performing or will perform one or more D2D operations or that the device is not active in D2D, or will stop being active in D2D. Any or all such circumstances—e.g., currently active, currently not active, activity upcoming, cessation of activity upcoming, etc.—may be regarded as status information encompassed by the term "D2D activity status." Additionally, or alternatively, that term encompasses information about the activity state(s) and/or activity state configurations of the wireless device, relating to discontinuous operation (RX and/or TX) of the wireless device on its network link and/or on its D2D link.

In any case, the method introduced immediately above further includes adapting one or more of radio procedures, based on the determining step. By way of non-limiting example, the network node configures one or more configuration parameters based on the determining step. For example, the network node changes the activity state configuration of the wireless device with respect to network communications and/or D2D communications, based on determining the D2D activity status of the wireless device.

With respect to device-side aspects of the teachings herein, in an example method a wireless device is configured for network communications in a wireless communication network and configured for D2D communications via a D2D link with other wireless devices. The method includes sending an indication of D2D-related activity to the wireless communication network, which thereby allows the network to adapt network and/or D2D operations with respect to the wireless device in dependence on the indication.

In an example implementation, the method of sending the indication includes determining a D2D activity status of the wireless device; triggering the sending of the indication in dependence on the D2D activity status; and sending the indication responsive to said triggering. For example, the triggering may comprise any one or more of: triggering the sending to occur within a certain time prior to starting a D2D operation; triggering the sending to occur within a certain time after starting a D2D operation; triggering the sending to occur within a certain time prior to expiration of an inactivity timer controlling an activity state of the wireless device with respect to network and/or D2D communications, where such triggering may be conditioned on whether the wireless device needs to remain active for D2D operations; and triggering the sending to occur responsive to detecting inactivity of the wireless device with respect to the wireless communication network.

In a further or alternative example, determining the D2D activity status of the wireless device comprises determining whether or not the wireless device has changed or has a pending change from being active to inactive, or vice versa, with respect to the D2D communication link, and triggering the sending of the indication in dependence on the determination of whether there is or will be such a change. Additionally or alternatively, determining the D2D activity status of the wireless device comprises determining the wireless device has changed activity states, or has a pending change in activity states, with respect to D2D communications, and triggering the sending of the indication in dependence on the determination of whether there is or will be such a change. Here, the term "pending" denotes an event that is scheduled to happen, or will happen, or is otherwise expected to happen at a certain time or within a certain window of time.

According to further example details, the indication of the device's D2D activity status is an indication that the wireless device is active on the D2D link; an indication that the wireless device will be active on the D2D link, an indication that the wireless device is not active on the D2D link, or an indication that the wireless device will stop being active on the D2D link. Additionally, or alternatively, the indication indicates a duration and/or start of D2D activity by the wireless device, or, similarly, indicates timing information regarding a duration or end of D2D activity by the wireless device.

In a further additional or alternative embodiment, sending the indication of D2D-related activity comprises sending an indication of one or more configuration parameters that control discontinuous operation by the wireless on the D2D link. For example, the wireless device indicates one or more Discontinuous Reception (DRX) and/or Discontinuous Transmission (DTX) timing parameters in use at the wireless device with respect to the D2D link.

In any case, it shall be understood that the wireless device may be configured to send the indication implicitly or explicitly. In a non-limiting example, the indication is a measurement report, such as a channel state information (CSI) report, a D2D buffer status report, or is a radio resource or scheduling request. As for implicit signaling of the indication, in one example the wireless device sends the indication implicitly by sending a signal or value according to a predefined value or signaling pattern that is recognized by said network as the indication. For example, the wireless device sends Channel Quality Indicator (CQI) values set to an out-of-range value, or by sending CQI values according to defined value pattern.

In another aspect of the teachings herein, a wireless device having network and D2D communications capabilities is configured to implement a method that includes adopting a first activity state configuration for operation in an increased activity state with respect to D2D communications, and reverting to a prior, second activity state configuration responsive to changing from the increased activity state to a reduced activity state with respect to D2D communications.

The method may further include, in conjunction with adopting the first activity state configuration, saving current values of one or more activity state configuration parameters into a memory of the wireless device. Here, the one or more activity state configuration parameters are one or more activity state configuration parameters that define the second activity state configuration and will be affected by the adoption of the first activity state configuration. Still further, the method may further include receiving signaling from the wireless communication network indicating the first and second activity state configurations.

In one aspect, then, the teachings herein provide examples of a method in a wireless device having network and D2D communications capabilities. Broadly, the method includes sending an indication to a network node, to inform the network node about its D2D activity, e.g., the device sends a message such as a measurement report, buffer report, etc., or some predefined signaling pattern or value, to indicate its D2D activity status. Correspondingly, the device receives activity state configuration information from the network node that accounts for device's indicated D2D activity status. The device uses the received activity state configuration at least for its network-related and/or D2D-related activity. For example, the network node may change the activity state of the wireless device on the D2D link in dependence on the device's D2D activity status and/or may change the activity state of device on the network link in dependence on that status.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 1 is a block diagram illustrating a "direct mode" data path in Device-to-Device (D2D) communications between two wireless devices.

FIG. 2 is a block diagram illustrating a "locally routed" data path for D2D communications between two wireless devices.

FIG. 3 is a block diagram illustrating a "default" data path between two wireless devices, based on network communications rather than D2D communications.

FIG. 8 is a logic flow diagram of one embodiment of a method of processing at a wireless device, for coordinating network communication activity targeting a wireless device, to coincide with D2D communication activity at the wireless device.

FIG. 9 is a logic flow diagram of one embodiment of a method of processing at a wireless device, for indicating the activity state of the wireless device with respect to D2D communications.

DETAILED DESCRIPTION

Generalizations

Figure 4:
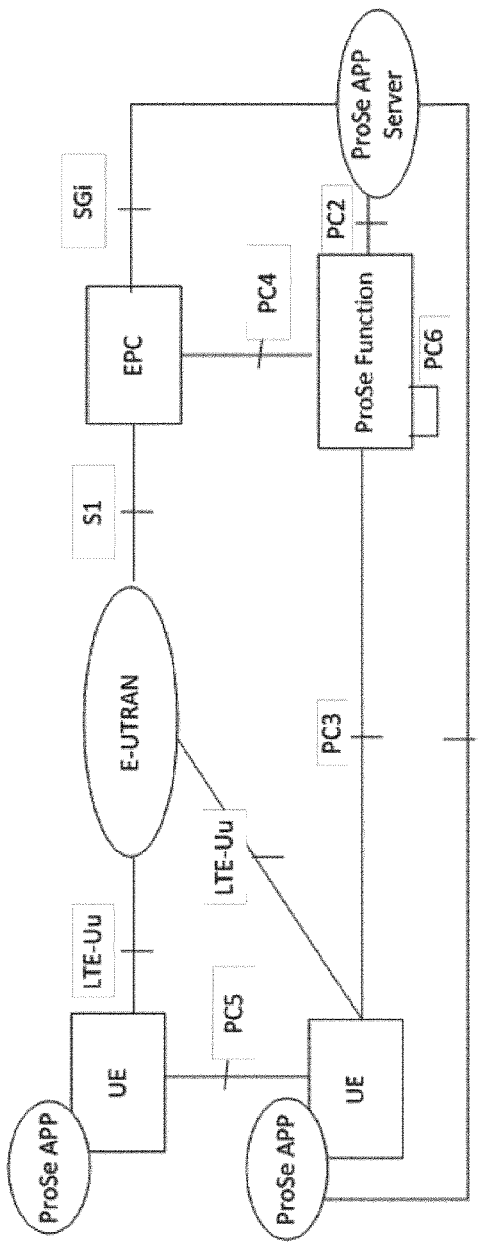
FIG. 4 is an example network architecture that incorporates D2D functionality.
Figure 5:
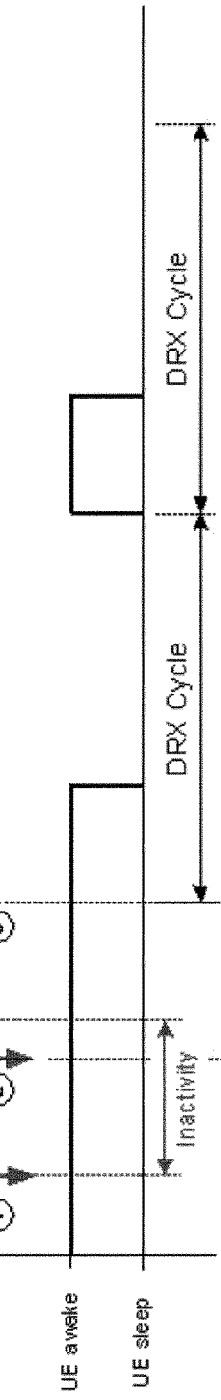
FIG. 5 is a diagram illustrating Discontinuous Reception (DRX) in a Long Term Evolution (LTE) context.

Device-to-device (D2D). In some examples, the terms 'D2D' and 'proximity service' (ProSe) may be used interchangeably.

D2D UE or D2D device or interchangeably called UE or even D2D-capable UE in some embodiments herein, may comprise any entity capable of at least receiving or transmitting radio signals on a direct radio link, i.e., between this entity and another D2D capable entity. A D2D-capable device may also be comprised in a cellular UE, PDA, a wireless device, laptop, mobile, sensor, relay, D2D relay, or even a small base station employing a UE-like interface, etc. A D2D-capable is able to support at least one D2D operation.

D2D operation may comprise any action or activity related to D2D, e.g., transmitting or receiving a signal/ channel type for D2D purpose, transmitting or receiving data by means of D2D communication, transmitting or receiving control or assistance data for D2D purpose, transmitting or receiving a request for control or assistance data for D2D, selecting a D2D operation mode, initiating/starting D2D operation, switching to D2D operation mode from a cellular operation mode, configuring receiver or transmitter with one or more parameters for D2D. D2D operation may be for a commercial purpose or to support public safety, using the data related to D2D. D2D operation may or may not be specific to a certain D2D service.

D2D transmission is any transmission by a D2D device. Some examples of D2D transmission are physical signals or physical channels, dedicated or common/shared, e.g., reference signal, synchronization signal, control channel, data channel, broadcast channel, paging channel, etc. A D2D transmission on a direct radio link is intended for receiving by another D2D device. A D2D transmission may be a unicast, groupcast, or broadcast transmission.

DL radio signal is a radio signal transmitted by a radio network node. UL radio signal transmitted by a UE. A radio signal transmitted by a D2D UE to another D2D UE is also considered herein an UL radio signal, though in some embodiments it may also be referred to as a direct radio signal.

A coordinating node: a node that schedules, decides, at least in part, or selects time frequency resources to be used for at least one of: cellular transmissions and D2D transmissions. The coordinating node may also provide the scheduling information to another node such as another D2D device, a cluster head, a radio network node such as eNodeB, or a network node (e.g. a core network node). The coordinating node may communicate with a radio network node.

Radio spectrum: Although at least some of the embodiments are described for D2D transmissions in the UL spectrum (FDD) or UL resources (TDD), the embodiments are not limited to the usage of UL radio resources, neither to licensed or unlicensed spectrum, or any specific spectrum at all.

A cellular network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT.

RAT (radio access technology): e.g. LTE, GSM, CDMA, WCDMA, WiFi, WLAN, WiMAX, etc.

The network node may be a radio network node or another network node. Some examples of the radio network node are a radio base station, a relay node, an access point, a cluster head, RNC, etc. The radio network node is comprised in a wireless communication network and may also support cellular operation. Some examples of a network node which is not a radio network node: a core network node, MME, a node controlling at least in part mobility of a wireless device, SON node, O&M node, positioning node, a server, an application server, a D2D server (which may be capable of some but not all D2D-related features), a node comprising a ProSe function, a ProSe server, an external node, or a node comprised in another network.

The embodiments described herein may be combined with each other in any way.

Methods in a D2D-Capable UE of Indicating Its D2D Activity

A basic embodiment in this aspect of the teachings herein is that a D2D-capable UE
- sends a message or an indication to a network node and thereby informs the network node about its D2D-related activity.

In one example, the message/indication may be indicative of that the UE is performing or will perform one or more D2D operations. In another example, the message/indication may be indicative of that the UE is not performing or will not perform one or more D2D operations. In yet another example, the message/indication may be indicative of that the UE is no more active on D2D or will stop to be active on D2D. In yet another example, the UE may indicate that it's D2D active and then later indicate that it's not any more D2D active when it completes its D2D operation.

The message/indication may be sent to the network node via physical layer (e.g., comprised in a physical radio signal or physical radio channel) or via higher layers (e.g., RRC) or a combination thereof. The indication may be implicit or explicit, e.g.:
- an implicit indication that the UE is active on D2D link,
- an explicit indication that the UE is active on D2D link
  - the explicit indication may further indicate the expected time duration or reference time until when the UE will be active or is expected to be active on D2D link,
- a valid measurement report or channel state report (e.g.,
  - a measurement report on cellular radio signals such as RSRP/RSRQ or D2D-related radio signals or CSI,
  - a pre-defined value of certain type of signal or an out-of-range indicator of certain type of signal such as CSI (e.g., CQI index 0 which is out of range),
- radio resource request or scheduling request,
- D2D buffer status report,
- other radio measurement report based on DL and/or UL signals (e.g. BCH BLER, PCH BLER, SINR, SNR, number of failed random access attempts etc).

The message/indication may be sent at different occasions and/or under different conditions, e.g., any one or more of:
- Prior (e.g., within a certain time) to starting D2D operation,
- After (e.g., within a certain time) starting D2D operation,
- Just before expiration of DRX inactivity timer or upon expiration of a specific timer if the UE needs to continue staying active due to D2D operation,
- If there is no on-going cellular operation (i.e., since the UE may be seen by the network as inactive if no message/indication is sent),
- When the UE battery is active due to any operation which may or may not be due to wireless communication, e.g. camera or video activity.

It may also be pre-defined or configured (in the UE or by a network node) that the message/indication is not sent at certain conditions, e.g., after expiration of timer/drx-InactivityTimer.

In another embodiment, the UE may further
- receive from the network node an activity state configuration accounting for the indicated D2D-related activity (responsive to the message/indication it sent), and
- use the received activity state configuration at least for the D2D-related activity.

The network node in order to take into account the indicated D2D-related activity may further determine more details about the UE D2D activity. For example if the UE only indicates that it is active on D2D link, then the network node may implicitly determine the time duration over which the UE will be active on the D2D link. In one exemplary implementation, the network node may determine the expected duration of the UE activity on D2D link based on one or more of: drx-InactivityTimer configured at the UE for use for the D2D link, historical information about the UE activity on D2D link etc, a pre-defined duration indicated by the UE and over which the UE is expected to be active on D2D link.

An example of the activity state configuration is DRX configuration. Another example of the activity state configuration is discontinuous transmission (DTX) configuration. Some examples of parameters of the activity state configuration are activity/inactivity periodicity, activity/inactivity duration, DRX cycle, DRX on-duration, DRX inactivity timer, DRX active time, DTX cycle length, DTX ON duration, DTX OFF duration, etc.

In yet another embodiment, the UE may store the activity state configuration used prior receiving from the network node the activity state configuration adapted for D2D operation. In yet another embodiment, the stored configuration may be used again when the UE is no longer active in D2D.

According to some embodiments herein, the UE is configured with an activity state configuration accounting for its D2D activity, e.g.,
- the UE may be configured with a second activity state configuration adapted for D2D operation, if a first activity state configuration is used for its cellular operation,
- the UE may be configured with one or more parameters of a common activity state configuration (i.e., for D2D operation and non-D2D operation), where the parameters are adapted to its D2D operation,
- the UE may be configured to stop the second activity state configuration adapted to its D2D operation or to stop using the parameters adapted to D2D operation or to use the activity state configuration used prior to the adaptation to D2D operation, if the D2D operation stops (e.g., according to the UE's message/indication indicative of that the UE is no longer D2D active).

Some examples of the adapted activity state configuration relate to DRX parameters, e.g., restarting/extending the inactivity timer for cellular DRX, changing DRX cycle adaptively to D2D operation, configuring separate DRX for D2D ('D2D DRX'), changing DRX cycle for D2D operation, changing DTX configuration, and any equivalent DTX parameters may also be configured.

Methods of Obtaining Resources for Sending the Message/Indication

According to one embodiment, prior to sending the message/indication, the UE obtains radio resources for using them for a radio transmission comprising the message/indication. The message/indication may be sent via an UL cellular link (e.g., RRC) using cellular resources or via a D2D link using D2D resources. The type of resources (cellular or D2D) may be pre-defined, configurable in the UE or by the network node, or decided by the UE dynamically. The resources may be obtained in different ways, e.g., may be any of:

Pre-defined,

Pre-configured at the UE or proactively assigned such as during initial setup,

Configured by a network node (in which case the resources are assigned according to the UE demand or request or periodically or when network node suspects that UE wants to send an indication), Selected according to a rule (e.g., based on availability or quality or load metric), Reused resources allocated for another purpose (e.g., for cellular operation), Randomly accessed e.g. on random access channel (RACH). For example certain random access preamble sequences can be pre-defined or configured by the network node for indicating that the UE activity state has changed e.g. one set for indicating that UE D2D activity state has changed from inactive to active and another one from active to inactive.

Methods in a Network Node of Adapting UE Activity State Configuration for D2D Operation Methods in a network node comprising the steps of:

Determining UE's D2D activity, e.g., that a UE is performing or will perform one or more D2D operations or that the D2D-capable UE is not active in D2D. The determining may be further based on one or more of the following mechanisms, The determining may be autonomous or implicit, e.g., based on measurements received from the UE D2D whose D2D activity is to be determined;

based on one or more measurements performed by another D2D UE on signals transmitted by the D2D UE whose D2D activity is to be determined;

based on one or more measurements performed by this or another network node based on the radio signals transmitted by the UE (the UE may not transmit the signals in an inactive state and may transmit the signals in the active state).

The determining may be based on a message/indication received from the UE. In one example, the message/indication may be indicative of that the UE is performing or will perform one or more D2D operations. In another example, the message/indication may be indicative of that the UE is no more active on D2D or will stop to be active on D2D. In yet another example, the UE may indicate that it's D2D active and then later indicate that it's not any more D2D active when it completes its D2D operation.

The determining of the D2D UE activity of the first D2D UE may be based on a message/indication received from another network node (second network node), which is explicitly or implicitly aware of the D2D UE activity of the first D2D UE. For example the first D2D UE may be involved in D2D communication with a second D2D UE, and wherein the first and second D2D UEs are managed or controlled or served by the first and the second network nodes respectively. The second network node based on the D2D activity level of the second D2D UE may implicitly determine the D2D activity level of the first D2D UE.

Adapting one or more of radio procedures, based on the determining step, e.g., any one or more of:

Configuring the UE with an activity state configuration accounting for its D2D activity or configuring the UE to stop using the configuration adapted for D2D in case the UE is no longer active in D2D), Sending the adapted activity state configuration to the UE or another node (e.g. neighboring network node such as to another eNode B over X2), Serving the UE (i.e., instigating UE involvement into cellular operation) during the time when it is active for D2D operation In one example, cellular operation may be configured until expiry of DRX inactivity timer which was adapted for D2D Configuring the UE to transmit cellular UL radio signals (e.g., SRS) for performing the UL measurements by the network Transmitting certain type of data, which is not time critical (e.g. updated measurement configuration message) to the UE during the time when the D2D UE is active on D2D link.

Requesting the UE to send stored or logged information obtained by the UE. For example logged measurement results obtained by the UE.

Abbreviations

D2D Device-to-Device
D2DSS D2D synchronization signal
D2DPSCH D2D physical synchronization channel
ProSe Proximity Service Examples of the invention relate to a wireless device sending or network node receiving an explicit signal indicating a D2D activity state of the wireless device, or determining an actual or particular scheduled D2D activity implicitly based on any received communication. The network node is arranged to configuring one or more parameter based on this determined information that a particular wireless device is or will be in a D2D communication state. In some examples, the network node is arranged to configure one or more parameter of the wireless device, e.g. relating to the reduced activity state (e.g. DRX and/or DTX configuration) of the wireless device. In an alternative or additional example, the network node is arranged to configure a parameter relating to radio procedures between the wireless device and network node. For example, communications to and/or from the network node or wireless device (cellular communication) is scheduled for a time when the wireless device is (or will be) active for D2D communication.

Additional Example Embodiments

1. A method implemented at a network node configured for operation in a wireless communication network, said method comprising:

determining a Device-to-Device (D2D) activity status of a wireless device that is registered in the network and has network communications capability and D2D communications capability; and adapting one or both of network and D2D operations with respect to the wireless device, in dependence on the determined activity status.

2. The method of embodiment 1, wherein determining the D2D activity status comprises any one or more of:
   determining that the wireless device is active on the D2D link;
   determining that the wireless device will be active on the D2D link, e.g., at a certain scheduled time or within a certain window of time;
   determining that the wireless device is not active on the D2D link;
   determining that the wireless device will stop being active on the D2D link, e.g., at a certain scheduled time or within a certain window of time;
   determining timing information regarding a duration and/or start of D2D activity by the wireless device; or
   determining timing information regarding a duration or end of D2D activity, where the indication is that the wireless device will stop being active on the D2D link.

3. The method of embodiment 1, wherein determining the D2D activity status comprises determining one or more parameters regarding discontinuous operation by the wireless on its D2D link, such as determining one or more Discontinuous Reception (DRX) and/or Discontinuous Transmission (DTX) timing parameters in use at the wireless device with respect to the D2D link.

4. The method of any of embodiments 1-3, wherein determining is based on any one or more of:
   measurements sent from the wireless device;
   measurements sent from another wireless device, based on signals transmitted from the wireless device;
   measurements made by the network node, or by another network node, on signals transmitted by the wireless device;
   an indication, such as a message, signal, or value, sent from the wireless device, which indication may be explicit or implicit, e.g., such as a predefined signaling pattern or value; or
   an indication sent from another network node, such as where the network node is a radio base station and receives the indication from another radio base station or a control node in the wireless communication network, which other network node is explicitly or implicitly aware of the D2D activity status of the wireless device.

5. The method of any of embodiments 1-4, wherein the determination of the D2D activity status comprises receiving an indication that the wireless device is performing, or will perform, one or more D2D operations, e.g., at a certain time or within a certain time window, or an indication that the wireless device has stopped, or will stop, performing one or more D2D operations, e.g., at a certain time or within a certain time window.

6. The method of any of embodiments 1-5, wherein said step of adapting comprises adapting network activity of the wireless device in the network in dependence on D2D activity of the wireless device, as determined from D2D activity status, e.g., scheduling network transmissions to or from the wireless device in dependence on the D2D activity of the wireless device.

7. The method of any of embodiments 1-6, wherein said step of adapting comprises or further comprises configuring a D2D activity state, configuring a network activity state, or both, in dependence on the D2D activity status, such as by configuring one or more parameters controlling discontinuous operation of the wireless device on the D2D link and/or the network link, in dependence on the D2D activity status.

8. The method of any of embodiments 1-7, wherein said step of adapting comprises or further comprises configuring one or more of uplink scheduling, downlink scheduling, and discontinuous reception and/or transmission operation of the wireless device in the network in dependence on the D2D activity of the wireless device, as determined from the D2D activity status.

9. The method of any of embodiments 1-8, wherein determining the D2D activity status of the wireless device comprises receiving an explicit or implicit indication of D2D activity for the wireless device.

10. The method of embodiment 9, wherein the indication indicates that:
    the wireless device is active on the D2D link;
    the wireless device will be active on the D2D link, e.g., at a certain scheduled time or within a certain window of time;
    the wireless device is not active on the D2D link;
    the wireless device will stop being active on the D2D link, e.g., at a certain scheduled time or within a certain window of time; or
    the wireless device is performing, or will perform, a D2D communication operation.

11. The method of embodiment 9, wherein the indication is implicit and wherein receiving the indication comprises detecting a predefined signaling pattern or value in signaling sent from the wireless device.

12. The method of embodiment 9, wherein receiving the indication comprises receiving a measurement report transmitted by the wireless device, such as a Channel State Information (CSI) report.

13. The method of embodiment 12, wherein adapting one or both of network and D2D operations with respect to the wireless device, in dependence on the determined activity status, comprises configuring the one or more parameters related to discontinuous operation of the wireless device with respect to network communications to at least partly align with discontinuous operation of the wireless device with respect to D2D communications.

14. The method of any of embodiments 1-13, wherein adapting one or both of network and D2D operations with respect to the wireless device, in dependence on the determined activity status, comprises or further comprises aligning a network-related activity of the wireless device to coincide with a D2D activity of the wireless device.

15. The method of any of embodiments 1-13, wherein adapting one or both of network and D2D operations with respect to the wireless device, in dependence on the determined activity status, comprises adapting one or more radio procedures involving the wireless device on its D2D link and/or network link, in dependence on the determined activity status.

16. A network node configured for operation in a wireless communication network, said network node comprising:
    a communication interface configured to communicate with wireless devices operating in the wireless communication network and/or to communicate with one or more other network nodes; and
    a processing circuit operatively associated with the communication interface and configured to:
       determine a Device-to-Device (D2D) activity status of a wireless device that is registered in the network and has network communications capability and D2D communications capability; and
       adapt one or both of network and D2D operations with respect to the wireless device, in dependence on the determined activity status.

17. The network node of embodiment 16, wherein the network node is configured to perform processing operations implementing any of the methods of embodiments 1-15.

18. A method in a network node configured for operation in a wireless communication network, said method comprising:
   determining a state of Device-to-Device (D2D) communication activity by a wireless device that is operating in a reduced-activity state with respect to the wireless communication network; and
   configuring one or more parameters for the operation in the wireless communication network and/or configuring one or more parameters for the operation of the D2D communication activity, based on the determination of the state of D2D communication activity.

19. A method in a wireless device configured for network communications in a wireless communication network and configured for Device-to-Device (D2D) communications via a D2D link with other wireless devices, said method comprising sending an indication of D2D-related activity to the wireless communication network.

20. The method of embodiment 21, wherein the indication comprises one of:
   an indication that the wireless device is active on the D2D link;
   an indication that the wireless device will be active on the D2D link;
   an indication that the wireless device is not active on the D2D link;
   an indication that the wireless device will stop being active on the D2D link; or
   an indication that a D2D activity state or D2D activity state configuration of the wireless device has changed.

21. The method of embodiment 20, further comprising any one or more of:
   indicating timing information regarding a duration and/or start of D2D activity, where the indication is that the wireless device will be active on the D2D link; and
   indicating timing information regarding a duration or end of D2D activity, where the indication is that the wireless device will stop being active on the D2D link.

22. The method of embodiment 19, wherein sending the indication of D2D-related activity comprises sending an indication of one or more parameters that configure discontinuous operation by the wireless device on the D2D link, such as by sending one or more Discontinuous Reception (DRX) and/or Discontinuous Transmission (DTX) timing parameters in use at the wireless device with respect to the D2D link.

23. The method of embodiment 19, further comprising any one or more of:
   triggering the sending to occur within a certain time prior to starting a D2D operation;
   triggering the sending to occur within a certain time after starting a D2D operation;
   triggering the sending to occur within a certain time prior to expiration of an inactivity timer controlling an activity state of the wireless device with respect to network and/or D2D communications, where such triggering may be conditioned on whether the wireless device needs to remain active for D2D operations;
   triggering the sending to occur responsive to detecting inactivity of the wireless device with respect to the wireless communication network; and
   triggering the sending to occur responsive to changes in a D2D activity state configuration of the wireless device.

24. The method of any of embodiments 19-23, further comprising any one of:
   sending the indication implicitly;
   sending the indication explicitly;
   sending the indication as a measurement report, such as a channel state information (CSI) report, a D2D buffer status report, or as a radio resource or scheduling request.

25. The method of any of embodiments 19-24, further comprising sending the indication implicitly by sending a signal or value according to a predefined value or signaling pattern that is recognized by said network as the indication, such as by sending Channel Quality Indicator (CQI) values set to an out-of-range value, or by sending CQI values according to defined value pattern.

26. The method of any of embodiments 19-25, wherein the indication comprises any one or more of: activity state configuration information for the wireless device with respect to the D2D link; and scheduling information for the wireless device with respect to the D2D link.

27. The method of any of embodiments 19-26, wherein said step of sending the indication comprises:
   determining a D2D activity status of the wireless device;
   triggering the sending of the indication in dependence on the D2D activity status; and
   sending the indication responsive to said triggering.

28. The method of embodiment 27, wherein determining the D2D activity status of the wireless device comprises determining whether or not the wireless device has changed or has a pending change from being active to inactive, or vice versa, with respect to the D2D communication link, and triggering the sending of the indication in dependence on the determination of whether there is or will be such a change.

29. The method of embodiment 27, wherein determining the D2D activity status of the wireless device comprises determining the wireless device has changed activity states, or has a pending change in activity states, with respect to D2D communications, and triggering the sending of the indication in dependence on the determination of whether there is or will be such a change.

30. The method of embodiment 19, wherein sending the indication of D2D-related activity to the wireless communication network comprises indicating a change in activity at the wireless device, e.g., such as by indicating a change with respect to a previously-reported activity state.

31. The method of embodiment 30, wherein the previously-reported activity state is the last reported activity state.

32. The method of embodiment 30 or 31, wherein indication indicates a change in activity state at the wireless device for D2D communications configured by the network node.

33. A method at a network node configured for operation in a wireless communication network, such as a radio base station, said method comprising:
   determining a timing or configuration of Device-to-Device (D2D) activity by a wireless device that is operating in the network and which device has D2D communications capability; and
   coordinating one or more network activities for the wireless device in dependence on the determined timing or configuration of the D2D activity, e.g., such that a timing or configuration of network activity for the device is made to depend on the timing or configuration of the D2D activity by the device.

34. A wireless device comprising:
- a communication interface that is configured for communicating with a wireless communication network, according to defined network communication protocols, and configured for communicating with one or more other wireless devices via Device-to-Device (D2D) communications, according to defined D2D communication protocols; and
- a processing circuit that is configured to send an indication of D2D-related activity to the wireless communication network, via said communication interface.

35. The wireless device of embodiment 34, wherein the processing circuit is configured to carry out processing operations implementing the method of any of embodiments 20-29.

36. A method at a wireless device that is configured for operation in a wireless communication network and is further configured for Device-to-Device (D2D) communications, said method comprising:
- adopting a first activity state configuration for operation in an increased activity state with respect to D2D communications; and
- reverting to a prior, second activity state configuration responsive to changing from the increased activity state to a reduced activity state with respect to D2D communications.

37. The method of embodiment 36, further comprising, in conjunction with adopting the first activity state configuration, saving current values of one or more activity state configuration parameters into a memory of the wireless device, said one or more activity state configuration parameters being one or more activity state configuration parameters that define the second activity state configuration and will be affected by the adoption of the first activity state configuration.

38. The method of embodiment 36 or 37, further comprising receiving signaling from the wireless communication network indicating the first and second activity state configurations.

39. A wireless device that is configured for operation in a wireless communication network and is further configured for Device-to-Device (D2D) communications, said wireless device comprising:
- a communication interface that is configured for communicating with the wireless communication network, according to defined network communication protocols, and configured for communicating with one or more other wireless devices via D2D communications, according to defined D2D communication protocols; and
- a processing circuit that is operatively associated with the communication interface and configured to:
  - adopt a first activity state configuration for operation in an increased activity state with respect to D2D communications; and
  - revert to a prior, second activity state configuration responsive to changing from the increased activity state to a reduced activity state, with respect to D2D communications.

40. The wireless device of embodiment 39, wherein, in conjunction with adopting the first activity state configuration, the processing circuit is configured to save current values of one or more activity state configuration parameters into a memory of the wireless device, said one or more activity state configuration parameters being one or more activity state configuration parameters that define the second activity state configuration and will be affected by the adoption of the first activity state configuration.

41. The wireless device of embodiment 39 or 40, wherein the processing circuit is configured to receive and process signaling from the wireless communication network indicating the first and second activity state configurations.

Example Network Node and Wireless Device Configurations

Figure 6:
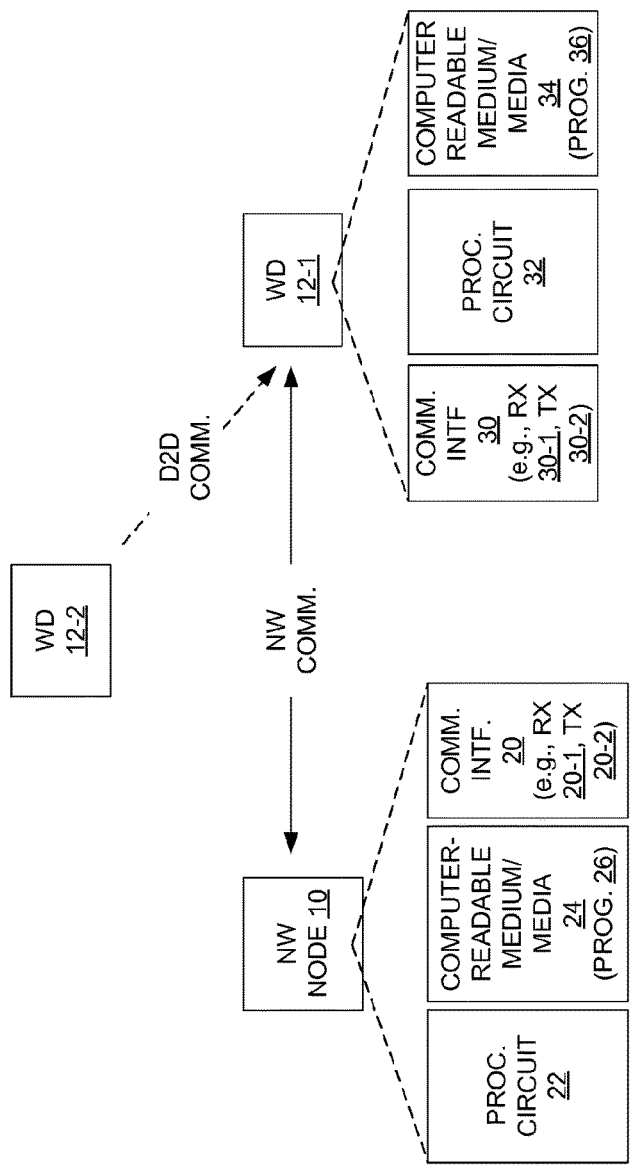
FIG. 6 is a block diagram of one embodiment of a network node and a wireless device configured to implement activity state control as taught herein.

FIG. 6 illustrates example details for one embodiment of a network node 10 and a wireless device 12-1, which is shown in context with another wireless device 12-2. By way of non-limiting example, the network node 10 comprises a radio base station or other node configured for operation in a wireless communication network, such as a cellular communication network configured according to the Long Term Evolution (LTE) specifications, or other Third Generation Partnership Project (3GPP) specifications.

Correspondingly, the wireless device 12-1 is configured for operation in a wireless communication network, wherein it communicates with the network node 10 or other network nodes according to defined network communication protocols. The wireless device 12-1 is further configured for Device-to-Device (D2D) communications, wherein it communicates with one or more other wireless devices 12 using defined D2D communication protocols. In a non-limiting example, the wireless device 12-1 comprises a 3GPP User Equipment or UE, and is configured for operation in a 3GPP communication network, such as an LTE-based cellular communication network.

The illustrated network node 10 is configured to implement the network-side processing disclosed in the above "Example Embodiments." As will be detailed later herein, in one embodiment, the network node 10 is configured to determining a time of D2D communication activity by a wireless device that is operating in a reduced-activity state with respect to the wireless communication network, and coordinating a network communication activity targeting the wireless device to coincide with the time of D2D communication activity, so that increase in communication network activity for the wireless device at least overlaps with the time of D2D communication activity.

Broadly, in one or more example embodiments the network node 10 is configured for operation in a wireless communication network and is further configured to align an increase in network communication activity for a wireless device with an increase in D2D communication activity at the wireless device. That is, at least certain types or kinds of communication network activity involving wireless devices that are operating in a reduced-activity state within the wireless communication network is coordinated to coincide (at least party overlap in time) with at least certain types of D2D communication activity by those devices. In so doing, the communication network exploits the fact that such devices are already in a heightened state of activity with respect to D2D communications, and thus can be coincidentally activated (or made more active) with respect to network communications. Such operations allow the network to at least reduce the number of times that a device has to be awakened (or otherwise made more active) solely for network communication activities, and, as a non-limiting example advantage, battery life at the device is thereby improved.

Correspondingly, the illustrated wireless device 12-1 is configured to implement the device-side processing disclosed in the above Example Embodiments. In one example, the wireless device 12-1 is configured for operation in communication network and is further configured for D2D communications. In particular, the wireless device 12-1 is configured to detect a current or pending change in an activity state of the wireless device with respect to D2D communications, and send an activity state indication to the wireless communication network to indicate the change, e.g., to send the indication directly or indirectly to the network node 10.

In another example embodiment, the wireless device 12-1 is configured for operation in a wireless communication network and is further configured for D2D communications. In particular, the wireless device 12-1 is configured to adopt a first activity state configuration for operation in an increased activity state with respect to D2D communications, and to revert to a prior, second activity state configuration responsive to changing from the increased activity state to a reduced activity state with respect to D2D communications.

FIG. 6 illustrates example circuit arrangements and it will be understood that the network node 10 and the wireless device 12-1 generally will include digital processing circuits (and associated memory or other computer-readable medium) for storing configuration data, operational or working data, and for storing computer program instructions. In at least some of the embodiments contemplated herein, the network-side and device-side functionality is realized at least in part through the programmatic configuration of digital processing circuitry, based on the execution by that circuitry of stored computer program instructions.

The example network node 10 includes a communication interface 20, a processing circuit 22 and an associated computer-readable medium (or media) 24 (e.g., one or more types of memory and/or storage devices, such as a mix of volatile, working memory and non-volatile configuration and program memory or storage). Example memory or storage devices include FLASH, EEPROM or Solid State Disk (SSD), for non-volatile storage, and DRAM or SRAM devices for volatile, working memory.

In at least one embodiment, the computer-readable medium 24 stores a computer program 26. In such embodiments, the network node 10 is at least partly configured to perform the network-side processing operations taught herein, based on its execution of computer program instructions comprising the stored computer program 26. Here, stored means "retained for future electronic retrieval," such as being stored for execution. The term thus encompasses retention in either nonvolatile or volatile memory.

Implementation of the communication interface 20 depends on the nature of the network node 10. In embodiments where the network node 10 is an LTE eNodeB or other radio base station, the communication interface 20 comprises radiofrequency receiver circuitry 20-1 and radiofrequency transmitter circuitry 20-2, for communicating with wireless devices 12 according to defined network communication protocols—i.e., according to defined air interface timing and signaling formats, as used by the type of communication network in which the network node 10 is configured to operate.

In other embodiments, the network node 10 is a control node that communicates with eNodeBs or other radio base stations supporting the operation of wireless devices 12. For example, the network node 10 is a type of operations and maintenance node (O&M). Consider the example of FIG. 7, which identifies the network node 10 using the reference number 10-1 and illustrates the node 10-1 communicating with the wireless device 12-1 via another network node 10-2.

Figure 7:
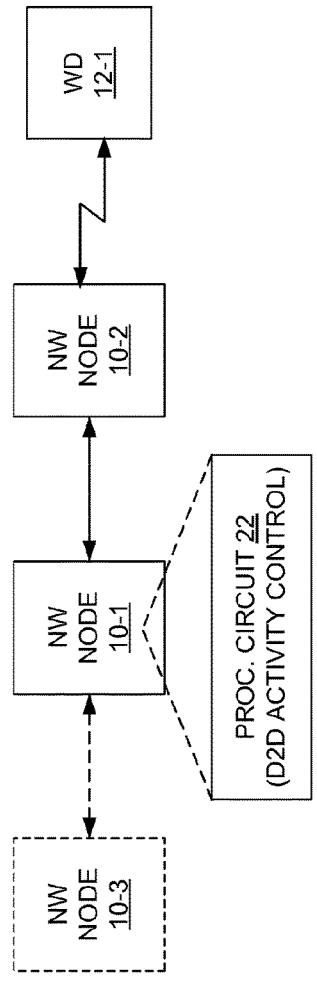
FIG. 7 is a block diagram of another embodiment of the network node introduced in FIG. 6.

This arrangement contrasts with the example of FIG. 6, which suggests a direct communication with the wireless device 12-1. FIG. 7 also indicates that the network node 10-1 may be in communication with another network node 10-3 (but that fact also holds for the example of FIG. 6). In some embodiments, the network node 10-1 receives information from other network nodes 10 regarding the activity state(s) of wireless devices 12 with respect to D2D communications, e.g., for wireless devices 12 not being served or controlled by the network node 10-1.

In one or more embodiments, the communication interface 20 includes more than one type of communication interface. Consider the case where the network node 10 comprises a radio base station. In such cases, the communication interface 20 includes a radio interface (20-1, 20-2) for communicating with wireless devices 12, and further includes an inter-base-station communication interface for communicating with other radio base stations, along with a core network communication interface for communicating with one or more nodes in an associated core network—e.g., for communicating with packet gateways, mobility and authentication management servers, etc. In an LTE example, the communication interface 20 would include an "X2" interface to other eNodeBs, and one or more "S1" interfaces to the LTE core network, which is referred to as an EPC.

The processing circuit 22 comprises, for example, digital processing circuitry that is fixed or programmed to perform network-side processing as taught herein. In one embodiment, the processing circuit 22 comprises one or more microprocessors, Digital Signal Processors (DSPs), ASIC, FPGAs, etc., which are configured according to the teachings herein. In one or more particular embodiments, the computer-readable medium 24 stores a computer program 26. Correspondingly, the processing circuit 22 is at least partly configured according to the teachings herein, based on its execution of the computer program instructions comprising the computer program 26.

Turning to the example wireless device 12-1, the device may be a cellular radiotelephone (smartphone, feature phone, etc.), a tablet or laptop computer, a network adaptor, card, modem or other such interface device, or essential device or other apparatus that is configured for wireless communication in the network 10, and further configured for D2D communications. In the 3GPP context, the wireless device 12-1 is referred to as a UE and it will be understood as including a communication interface 30, including a radiofrequency receiver circuitry 30-1 and a radiofrequency transmitter circuitry 30-2. This circuitry and the overall device 12-1 are configured for network communications according to the applicable network communication protocols, and are further configured for D2D communications according to the applicable D2D communication protocols.

The communication interface 30 may comprise a mix of analog and digital circuits. For example, the receiver 30-1 in one or more embodiments comprises a receiver front-end circuit (not explicitly shown in FIG. 6) that generates one or more streams of digital signal samples corresponding to antenna-received signals, and further includes one or more receiver processing circuits—e.g., baseband digital processing circuitry and associated buffer memory—which operate on the digital samples. Example operations include linearization or other channel compensation, possibly with interference suppression, and symbol demodulation/detection and decoding, for recovering transmitted information.

The wireless device 12-1 further includes a processing circuit 32 that is operatively associated with the communication interface 30. The processing circuit 32 includes or is associated with a computer-readable medium (or media) 34. The computer-readable medium 34 comprises, for example, a mix of volatile, working memory and non-volatile configuration and program memory. Non-limiting examples of the former include Static RAM or SRAM, while non-limiting examples of the latter include FLASH, EEPROM, and SSD storage.

The processing circuit 32 provides, for example, digital baseband processing for the receive (RX) signals and transmit (TX) data and control signals received and transmitted through the communication interface 30. The processing circuit 32 in this regard comprises digital processing circuitry and may be implemented as one or more microprocessors, DSPs, ASICs, FPGAs, etc. More generally, the processing circuit 32 may be implemented using fixed circuitry or programmed circuitry, or a mix of both. In an example embodiment, the computer-readable medium 34 stores a computer program 36. The processing circuit 32 in such embodiments is at least partly configured according to the teachings herein, based on its execution of the computer program instructions comprising the computer program 36.

Regardless of its particular implementation details, the network node 10 in one embodiment is configured to implement a method 800, such as is shown in FIG. 8. The method 800 includes determining 802 a D2D activity status of a wireless device 12 that is registered in the wireless communication network associated with the network node 10. By way of example, "registered" means that the wireless device 12 has been admitted to the network or has otherwise connected and authenticated itself with the network, such that the device 12 is known to the network, although the device may currently be in an inactive state—e.g., RRC idle state—in the context of the network.

Further, by way of example, determining the D2D activity status of the device 12 comprises any one or more of determining that the device 12 is active on its D2D link, determining that the device 12 will be active on its D2D link, e.g., at a certain time or within a certain window of time, determining that the device 12 is not active on its D2D link, determining that the device will stop being active on its D2D link, e.g., at a certain time or within a certain window of time, determining a D2D activity state of the device 12, e.g., determining its level of activity on the D2D link or otherwise determining information about its D2D activity state configuration. The determination may be made, for example, based on receiving an indication sent from the device 12, or sent from another network node having knowledge of the activity status.

The method 800 further includes adapting 804 one or both of network and D2D operations with respect to the wireless device 12, in dependence on the D2D activity status. For example, the network node adapts one or more radio procedures based on the D2D activity status. In a non-limiting example, the network node 10 adapts network activity involving the device 12 in dependence on the D2D activity status, e.g., the D2D activity status indicates the device's D2D activity state configuration and the network adapts the device's network activity state configuration in dependence on the device's D2D activity state configuration.

In other examples, the network node 10 controls network activity involving the device 12, in dependence on D2D activity, as determined from the D2D activity status. For example, the network node 10 may coordinate a network activity involving the device 12 to coincide with D2D activity at the wireless device 12. For example, the network node 10 aligns an uplink transmission from or a downlink transmission to the device 12 to align with D2D communications activity at the device 12, or aligns measurement reporting by the device to align with such D2D activity. These non-limiting examples can be understood as the network exploiting knowledge of those times when the device 12 is already expending power on D2D operations, such that one or more network activities can be configured to coincide with such D2D operations. Such operations are particularly advantageous when the wireless device 12 is operating in a state of reduced activity with respect to the wireless communication network, inasmuch as network activity can be coordinated with D2D activity.

FIG. 9 illustrates a complementary device-side method 900 according to one embodiment. In the context of method 900, the wireless device 12-1 is configured for operation in a wireless communication network and is further configured for D2D communications. The method 900 includes sending an indication of D2D-related activity to the wireless communication network. More particularly, at some point the wireless device 12 initially connects to and registers with the network (Block 902), although for purposes of any following steps in the method 900, the device 12 may be inactive or at least operating in a state of reduced activity with respect to the wireless communication network (e.g., DRX and/or DTX operation).

The method 900 further includes sending an indication of D2D-related activity to the network (Block 904), e.g., to the network node 10. In example cases, the indication is an indication that the wireless device is active on the D2D link, an indication that the wireless device will be active on the D2D link, an indication that the wireless device is not active on the D2D link, or an indication that the wireless device will stop being active on the D2D link. Additionally, or alternatively, where the wireless device 12 will be active on the D2D link, it may indicate timing information regarding a duration and/or start of D2D activity, or where the device 12 will stop being active on the D2D link, it may indicate timing information regarding a duration or end of D2D activity.

In any case, the step of sending (Block 904) may comprise determining (Block 904A) the D2D activity status of the wireless device 12—e.g., is active, will be active, is not active, will stop being active, etc.—and triggering (Block 904B) the sending of the indication in dependence on the status, and sending (Block 904C) the indication responsive to the trigger. That is, the wireless device 12 may monitor or otherwise determine its D2D activity status and determine whether or not that status should be indicated to the network. As an example of such conditional triggering of the indication, the device 12 may trigger the indication sending responsive to determining that the device 12 is active on its D2D link, will be active on its D2D link at a certain time or within a certain time window, has stopped being active on its D2D link, or will stop being active at a certain time or within a certain time window, and/or has changed its D2D activity state configuration. The sending may be further based on determining whether or not the device 12 is operating in reduced-activity state with respect to the network.

Figure 10:
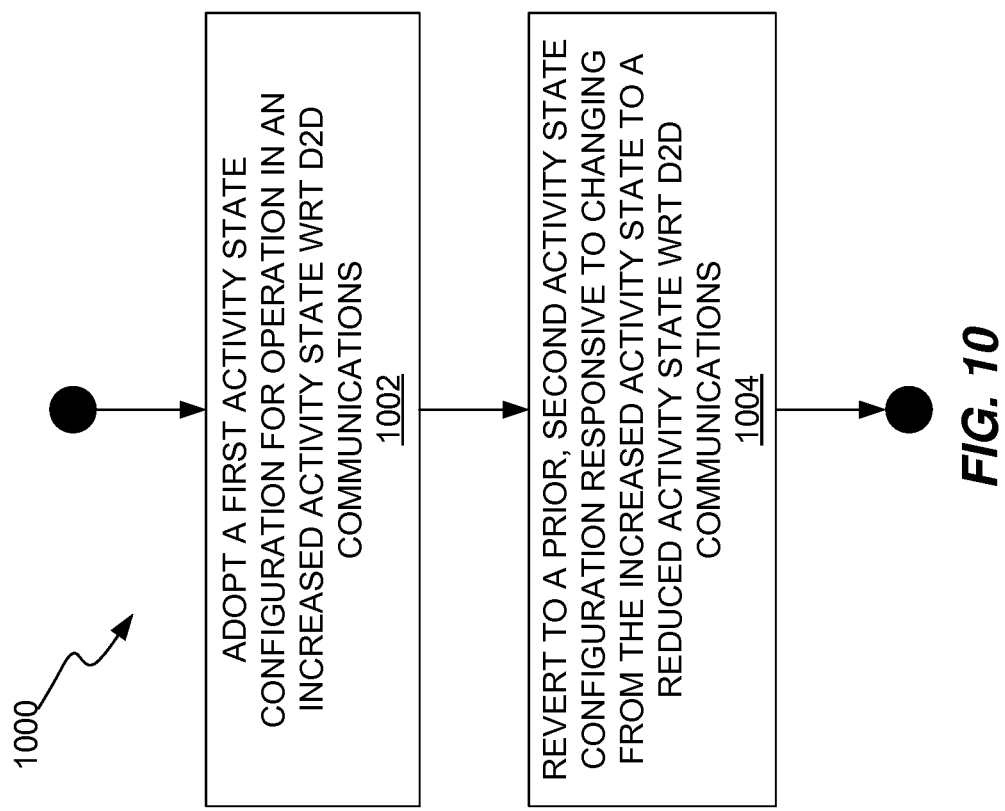
FIG. 10 is a logic flow diagram of another embodiment of a method of processing at a wireless device, for controlling the activity state configuration of the wireless device with respect to changes in D2D communications activity.

FIG. 10 illustrates another complementary device-side method 1000 according to one embodiment. In the context of method 1000, the wireless device 12-1 is configured for operation in a wireless communication network and is further configured for D2D communications, and the method 900 includes adopting (Block 1002) a first activity sate configuration for operation in an increased activity state with respect to D2D communications. The method 1000 further includes reverting (Block 1004) to a prior, second activity state configuration responsive to change from the increased activity state to a reduced activity state with respect to (WRT) D2D communications.

Here, a "higher activity state" or, equivalently, an "increased activity state," is a relative term and it encompasses full-on, active or awake states at the wireless device 12-1 where its receiver 20-1 and/or transmitter 20-2 are on. The term more broadly encompasses any D2D radio link monitoring or communication state that is more active than another activity state referenced as a "reduced activity state."

Figure 11:
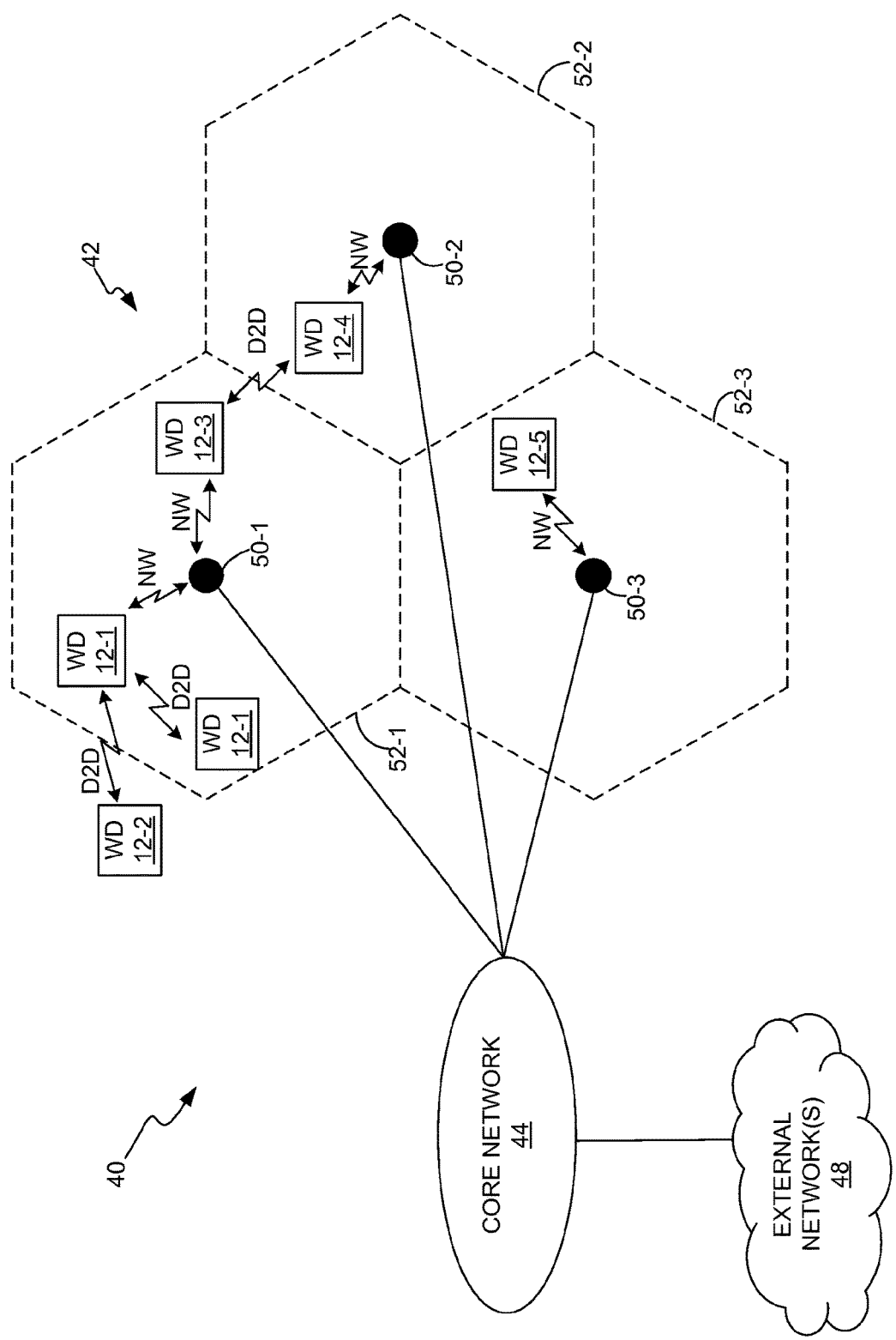
FIG. 11 is a block diagram for one embodiment of a wireless communication network, wherein a base station or other network node is configured to operate as the network node introduced in FIG. 6.

FIG. 11 illustrates an example wireless communication network 40 that includes a Radio Access Network (RAN) 42 and a Core Network (CN) 44. The network 40 communicatively couples wireless devices 12 to one or more external networks 48, such as the Internet or another packet data network. The diagram is simplified for ease of discussion and it will be appreciated that the network 40 may include additional examples of any one or more of the illustrated entities and may include other entities not illustrated. For example, the CN 44 may include Mobility Management Entities or MMEs, Serving Gateways or SGWs, a Packet Gateway or PGW, and one or more other nodes, such as positioning nodes, O&M nodes, etc.

The RAN 42 includes a number of base stations 50-1, 50-2 and 50-3, which in the LTE context are referred to as eNBs or eNodeBs. Unless suffixes are needed for clarity, the reference number "50" will be used to refer to base stations in the singular and plural sense. Each base station 50 uses certain air interface resources—e.g., spectrum, carriers, channels, etc.—to provide service over a given area, referred to as a "cell." Accordingly, in FIG. 11, the base station 50-1 provides a cell 52-1, the base station 50-2 provides a cell 52-2, and the base station 50-3 provides a cell 52-3. Unless suffixes are needed for clarity, the reference number "52" will be used herein to refer to cells in the singular and plural sense.

Of course, a given base station 50 may provide more than one cell 52, e.g., in the case of multi-carrier operation, and the teachings herein are not limited to arrangement of base stations 50 and cells 52 depicted in FIG. 11. For example, the cell sizes may be adaptive or non-uniform. In the latter case, the network 40 may comprise a heterogeneous network where one or more large cells, referred to as "macro" cells are overlaid by one or more smaller cells, referred to a "micro," "pico," or "femto," cells. These smaller cells are provided by low-power access points and may be used as service hotspots that provide higher data rate services and/or may be used to extend or fill in the service coverage provided by the macro cells. In some heterogeneous deployments, the micro cells use the same radio access technology used by the macro cells, e.g., LTE-based micro cells overlaying LTE-based macro cells.

In some embodiments of the wireless communication network 40, one or more of the base stations 50 operate as the aforementioned network node 10 or 10-1. That is, any given one or ones of the base stations 50 are configured to determining a time of D2D communication activity by a wireless device 12 that is operating in a reduced-activity state with respect to the wireless communication network 40, and to coordinating a network communication activity targeting the wireless device 12, to coincide with the time of D2D communication activity. Such operation advantageously aligns the increase in communication network activity for the wireless device so that it at least partly overlaps with the time of D2D communication activity.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method implemented at a network node configured for operation in a wireless communication network, said method comprising:
   determining, from a radio resource request for a Device-to-Device (D2D) link between a wireless device and another wireless device, a D2D activity status of the wireless device that is registered in the wireless communication network and has network communications capability and D2D communications capability with the another wireless device; and
   adapting one or both of network and D2D operations with respect to the wireless device, in dependence on the D2D activity status determined from the radio resource request,
   wherein the radio resource request for the D2D link is received from the wireless device,
       wherein the adapting comprises adapting network activity of the wireless device in the wireless communication network in dependence on D2D activity of the wireless device, as determined from the D2D activity status, scheduling network transmissions from the wireless device in dependence on the D2D activity of the wireless device.

2. The method of claim 1, wherein the determining comprises any one or more of:
   determining that the wireless device is active on the D2D link;
   determining that the wireless device will be active on the D2D link at a certain scheduled time or within a certain window of time;
   determining that the wireless device is not active on the D2D link;
   determining that the wireless device will stop being active on the D2D link at a certain scheduled time or within a certain window of time;
   determining timing information regarding a duration and/or start of the D2D activity by the wireless device; or
   determining timing information regarding a duration or end of the D2D activity by the wireless device.

3. The method of claim 1, wherein the determining comprises determining one or more parameters regarding discontinuous operation by the wireless device on the D2D link, and determining one or more Discontinuous Reception and/or Discontinuous Transmission timing parameters in use at the wireless device with respect to the D2D link.

4. The method of claim 1, wherein the determining is based on any one or more of:
   measurements sent from the wireless device;
   measurements sent from the another wireless device, based on signals transmitted from the wireless device;
   measurements made by the network node, or by another network node, on signals transmitted by the wireless device;

an indication sent from the wireless device, which indication is either explicit or implicit;
or
an indication sent from the another network node, which another network node is explicitly or implicitly aware of the D2D activity status of the wireless device.

5. The method of claim 1, wherein the determining comprises receiving an indication that the wireless device is performing, or will perform, one or more D2D operations at a certain time or within a certain time window, or an indication that the wireless device has stopped, or will stop, performing one or more D2D operations at a certain time or within a certain time window.

6. The method of claim 1, wherein the adapting comprises adapting the network activity of the wireless device in the wireless communication network in dependence on the D2D activity of the wireless device, as determined from the D2D activity status, scheduling network transmissions to the wireless device in dependence on the D2D activity of the wireless device.

7. The method of claim 1, wherein the adapting comprises configuring a D2D activity state, configuring a network activity state, or both, in dependence on the D2D activity status, and configuring one or more parameters controlling discontinuous operation of the wireless device on the D2D link and/or network link, in dependence on the D2D activity status.

8. The method of claim 1, wherein the adapting comprises configuring one or more of uplink scheduling, downlink scheduling, and discontinuous reception and/or transmission operation of the wireless device in the wireless communication network in dependence on the D2D activity of the wireless device, as determined from the D2D activity status.

9. The method of claim 1, wherein the determining comprises receiving an explicit or implicit indication of the D2D activity for the wireless device.

10. The method of claim 9, wherein the indication indicates that:
the wireless device is active on the D2D link;
the wireless device will be active on the D2D link at a certain scheduled time or within a certain window of time;
the wireless device is not active on the D2D link;
the wireless device will stop being active on the D2D link at a certain scheduled time or within a certain window of time; or
the wireless device is performing, or will perform, a D2D communication operation.

11. The method of claim 9, wherein the indication is implicit and wherein receiving the indication comprises detecting a predefined signaling pattern or value in signaling sent from the wireless device.

12. The method of claim 9, wherein receiving the indication comprises receiving a measurement report transmitted by the wireless device, and the measurement report is a Channel State Information report.

13. The method of claim 7, wherein the adapting comprises configuring the one or more parameters related to discontinuous operation of the wireless device with respect to the network communications to at least partly align with discontinuous operation of the wireless device with respect to the D2D communications.

14. The method of claim 1, wherein the adapting comprises aligning a network-related activity of the wireless device to coincide with the D2D activity of the wireless device.

15. The method of claim 1, wherein the adapting comprises adapting one or more radio procedures involving the wireless device on the D2D link and/or network link, in dependence on the determined D2D activity status.

16. The method of claim 1,
wherein the determining comprises determining a state of Device-to-Device (D2D) communication activity by the wireless device that is operating in a reduced-activity state with respect to the wireless communication network; and
wherein the adapting comprises configuring one or more parameters for the operation in the wireless communication network and/or configuring one or more parameters for the operation of the D2D communication activity, based on the determination of the state of D2D communication activity.

17. The method of claim 1,
wherein the determining comprises determining a timing or configuration of the D2D activity by the wireless device that is operating in the wireless communication network and which device has the D2D communications capability; and
the adapting comprises coordinating one or more network activities for the wireless device in dependence on the determined timing or configuration of the D2D activity.

18. The method of claim 17, wherein the timing or configuration of the network activity for the wireless device is made to depend on the timing or configuration of the D2D activity by the wireless device.

19. A network node configured for operation in a wireless communication network, said network node comprising:
a communication interface configured to communicate with wireless devices operating in the wireless communication network and/or to communicate with one or more other network nodes; and
a processing circuit operatively associated with the communication interface and configured to:
determine, from a radio resource request for a Device-to-Device (D2D) link between a wireless device and another wireless device, a D2D activity status of the wireless device that is registered in the wireless communication network and has network communications capability and D2D communications capability with the another wireless device; and
adapt one or both of network and D2D operations with respect to the wireless device, in dependence on the D2D activity status determined from the radio resource request,
wherein the radio resource request for the D2D link is received from the wireless device;
wherein the adapting comprises adapting network activity of the wireless device in the wireless communication network in dependence on D2D activity of the wireless device, as determined from the D2D activity status, scheduling network transmissions from the wireless device in dependence on the D2D activity of the wireless device.

20. The network node of claim 19, wherein the network node is configured to perform processing operations by performing any one or more of:
determining that the wireless device is active on the D2D link;
determining that the wireless device will be active on the D2D link at a certain scheduled time or within a certain window of time;
determining that the wireless device is not active on the D2D link;

determining that the wireless device will stop being active on the D2D link at a certain scheduled time or within a certain window of time;

determining timing information regarding a duration and/or start of the D2D activity by the wireless device; or determining timing information regarding a duration or end of the D2D activity the wireless device.

21. A method in a wireless device configured for network communications in a wireless communication network and configured for Device-to-Device (D2D) communications via a D2D link with other wireless devices, said method comprising:

sending an indication of D2D-related activity to the wireless communication network, wherein the indication of the D2D-related activity is a radio resource request for the D2D link with one of said other wireless devices; and being adapted with respect to one or both of network and D2D operations, wherein the being adapted comprises being adapted with respect to network activity of the wireless device in the wireless communication network in dependence on the D2D-related activity of the wireless device, as indicated by the radio resource request for the D2D link, where network transmissions from the wireless device are scheduled in dependence on the D2D-related activity of the wireless device.

22. The method of claim 21, wherein the indication comprises one of:

an indication that the wireless device is active on the D2D link;

an indication that the wireless device will be active on the D2D link;

an indication that the wireless device is not active on the D2D link;

an indication that the wireless device will stop being active on the D2D link; or an indication that a D2D activity state or D2D activity state configuration of the wireless device has changed.

23. The method of claim 21, further comprising any one or more of:

indicating timing information regarding a duration and/or start of the D2D activity, where the indication is that the wireless device will be active on the D2D link; and indicating timing information regarding a duration or end of the D2D activity, where the indication is that the wireless device will stop being active on the D2D link.

24. The method of claim 21, wherein sending the indication of the D2D-related activity comprises sending an indication of one or more parameters that configure discontinuous operation by the wireless device on the D2D link, by sending one or more Discontinuous Reception and/or Discontinuous Transmission timing parameters in use at the wireless device with respect to the D2D link.

25. The method of claim 21, further comprising any one or more of:

triggering the sending to occur within a certain time prior to starting a D2D operation;

triggering the sending to occur within a certain time after starting a D2D operation;

triggering the sending to occur within a certain time prior to expiration of an inactivity timer controlling an activity state of the wireless device with respect to network and/or D2D communications, where such triggering is conditioned on whether the wireless device needs to remain active for the D2D operations;

triggering the sending to occur responsive to detecting inactivity of the wireless device with respect to the wireless communication network; and triggering the sending to occur responsive to changes in a D2D activity state configuration of the wireless device.

26. The method of claim 21, further comprising any one of:

sending the indication implicitly;

sending the indication explicitly;

sending the indication as a measurement report, a channel state information report, a D2D buffer status report, or as a radio resource or scheduling request.

27. The method of claim 21, further comprising sending the indication implicitly by sending a signal or value according to a predefined value or signaling pattern that is recognized by said wireless communication network as the indication, and by sending Channel Quality Indicator (CQI) values set to an out-of-range value, or by sending CQI values according to defined value pattern.

28. The method of claim 21, wherein the indication comprises any one or more of: activity state configuration information for the wireless device with respect to the D2D link; and scheduling information for the wireless device with respect to the D2D link.

29. The method of claim 21, wherein said step of sending the indication comprises:

determining a D2D activity status of the wireless device;

triggering the sending of the indication in dependence on the D2D activity status; and sending the indication responsive to said triggering.

30. The method of claim 29, wherein determining the D2D activity status of the wireless device comprises determining whether or not the wireless device has changed or has a pending change from being active to inactive, or vice versa, with respect to the D2D link, and triggering the sending of the indication in dependence on the determination of whether there is or will be such a change.

31. The method of claim 29, wherein determining the D2D activity status of the wireless device comprises determining the wireless device has changed activity states, or has a pending change in activity states, with respect to the D2D communications, and triggering the sending of the indication in dependence on the determination of whether there is or will be such a change.

32. The method of claim 21, wherein sending the indication of the D2D-related activity to the wireless communication network comprises indicating a change in activity at the wireless device, by indicating a change with respect to a previously-reported activity state.

33. The method of claim 32, wherein the previously-reported activity state is last reported activity state.

34. The method of claim 32, wherein the indicating indicates a change in activity state at the wireless device for the D2D communications configured by the network node.

35. The method of claim 21, said method comprising:

adopting a first activity state configuration for operation in an increased activity state with respect to the D2D communications; and reverting to a prior, second activity state configuration responsive to changing from the increased activity state to a reduced activity state with respect to the D2D communications.

36. The method of claim 35, further comprising, in conjunction with adopting the first activity state configuration, saving current values of one or more activity state configuration parameters into a memory of the wireless device, said one or more activity state configuration parameters being one or more activity state configuration parameters that define the second activity state configuration and will be affected by the adoption of the first activity state configuration.

37. The method of claim 35, further comprising receiving signaling from the wireless communication network indicating the first and the second activity state configurations.

38. A wireless device comprising:
a communication interface that is configured for communicating with a wireless communication network, according to defined network communication protocols, and configured for communicating with one or more other wireless devices via Device-to-Device (D2D) communications, according to defined D2D communication protocols; and
a processing circuit that is configured to send an indication of D2D-related activity to the wireless communication network, via said communication interface
wherein the indication of the D2D-related activity is a radio resource request for the D2D link with one of said other wireless devices,
wherein the wireless device is configured to be adapted to with respect to one or both of network and D2D operations, wherein the being adapted comprises being adapted with respect to network activity of the wireless device in the wireless communication network in dependence on the D2D-related activity of the wireless device, as indicated by the radio resource request for the D2D link, where network transmissions from the wireless device are scheduled in dependence on the D2D-related activity of the wireless device.

39. The wireless device of claim 38, wherein the indication comprises one of:

an indication that the wireless device is active on the D2D link;
an indication that the wireless device will be active on the D2D link;
an indication that the wireless device is not active on the D2D link;
an indication that the wireless device will stop being active on the D2D link; or
an indication that a D2D activity state or D2D activity state configuration of the wireless device has changed.

40. A wireless device as claimed in claim 38,
wherein the processing circuit is operatively associated with the communication interface and configured to:
adopt a first activity state configuration for operation in an increased activity state with respect to the D2D communications; and
revert to a prior, second activity state configuration responsive to changing from the increased activity state to a reduced activity state, with respect to the D2D communications.

41. The wireless device of claim 40, wherein, in conjunction with adopting the first activity state configuration, the processing circuit is configured to save current values of one or more activity state configuration parameters into a memory of the wireless device, said one or more activity state configuration parameters being one or more activity state configuration parameters that define the second activity state configuration and will be affected by the adoption of the first activity state configuration.

42. The wireless device of claim 40, wherein the processing circuit is configured to receive and process signaling from the wireless communication network indicating the first and second activity state configurations.

* * * * *